United States Patent
Brorein et al.

[15] 3,693,250
[45] Sept. 26, 1972

[54] METHOD OF MAKING METALLIC SHEATHED CABLES WITH FOAM CELLULAR POLYOLEFIN INSULATION AND METHOD OF MAKING

[72] Inventors: William J. Brorein, 17 Longview Drive, Whippany; Fred F. Polizzano, 520 Brookside Ave., Allendale, both of N.J.

[22] Filed: July 20, 1970
[21] Appl. No.: 56,325

Related U.S. Application Data

[62] Division of Ser. No. 733,528, May 31, 1968, Pat. No. 3,567,846.

[52] U.S. Cl. ............ 29/624, 29/429 R, 29/202.5, 29/473.9 R, 156/50, 156/54
[51] Int. Cl. ............................................. H01b 13/00
[58] Field of Search ..... 174/102, 107; 29/624, 202.5, 29/429, 473.9; 156/47–56

[56] References Cited

UNITED STATES PATENTS

| | | |
|---|---|---|
| 3,118,800 | 1/1964 | Snelling ............... 29/624 UX |
| 3,325,589 | 6/1967 | Mildner ............... 156/54 X |
| 3,344,228 | 9/1967 | Woodland et al. ..... 29/624 UX |
| 3,365,534 | 1/1968 | Volk ..................... 156/53 |
| 3,373,244 | 3/1968 | Holland ............... 29/624 X |
| 3,451,861 | 6/1959 | Gorden ............. 174/102 R X |

*Primary Examiner*—John F. Campbell
*Assistant Examiner*—Robert W. Church
*Attorney*—Sandoe, Hopgood & Calimafde

[57] ABSTRACT

This specification discloses a method of making a metallic sheathed electrical cable having foamed cellular polyolefin dielectric insulation which is fusion-bonded to the inside of an annealed sheath to obtain better electrical and mechanical characteristics. The sheath is applied to a foam-insulated core and then sunk down by drawing through a die or reducing rolls to make the tube fit the insulated core snugly. Controlled heating of the sheathing melts the part of the insulation, or adhesive material, when used, which is in contact with the sheath to produce the fusion bond. The heating period is short and is followed by a quench. This controlled heating and cooling is also used to anneal the metallic sheath.

14 Claims, 10 Drawing Figures

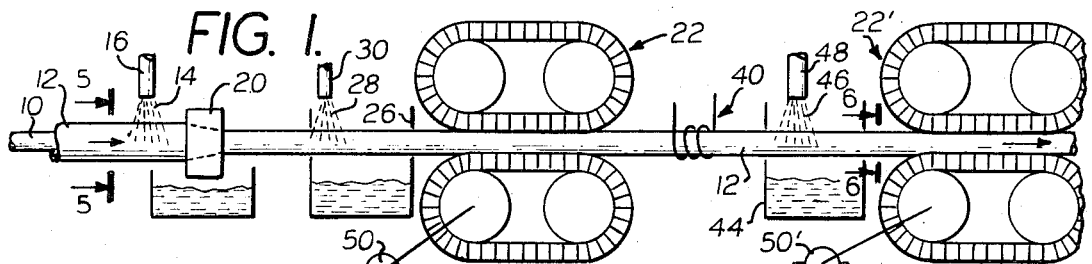
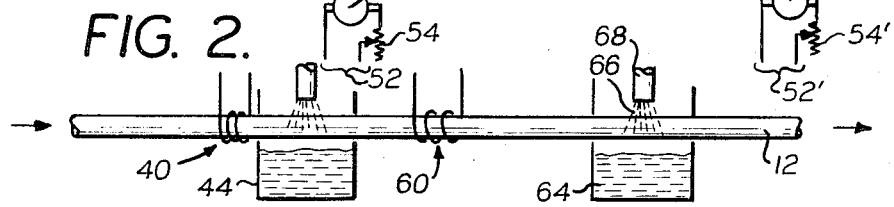
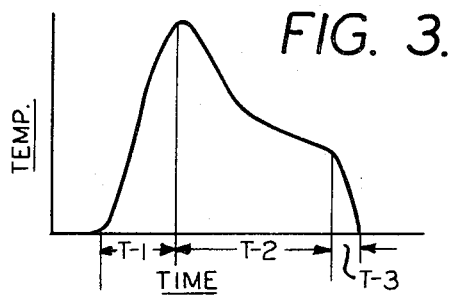
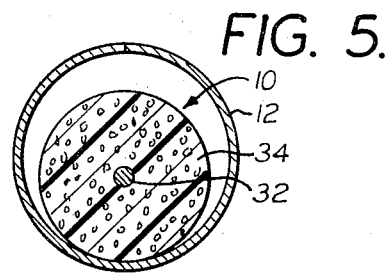
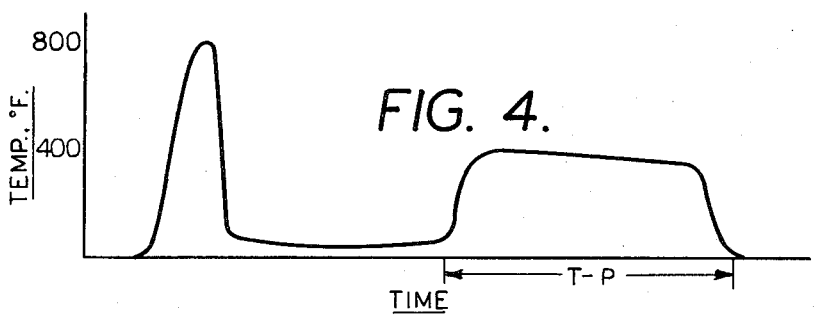
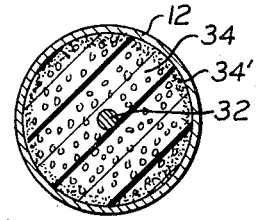
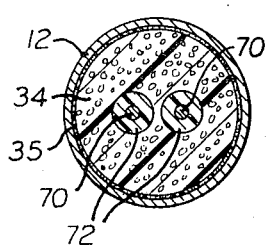
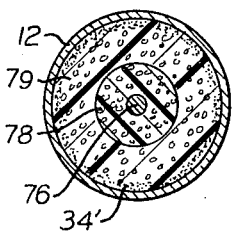
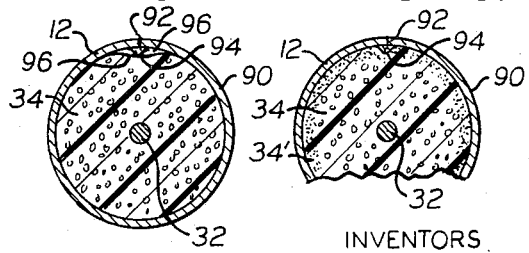

METHOD OF MAKING METALLIC SHEATHED CABLES WITH FOAM CELLULAR POLYOLEFIN INSULATION AND METHOD OF MAKING

RELATED PATENTS, APPLICATIONS AND PUBLICATIONS

This application is a division of our patent application Serial No. 733,528, filed May 31, 1968, now Pat. No. 3,567,846 issued Mar. 2, 1971.

A metal sheathed electrical cable and method of making it are disclosed in U.S. Pat. No. 3,356,790 issued Dec. 7, 1967 to Polizzano and Robinson and in the patent application of Oscar G. Garner, Ser. No. 517,706, filed Dec. 30, 1965, now U.S. Pat. No. 3,430,330 for Aluminum-Sheathed Coaxial Cable. Apparatus for carrying out the method of this invention is disclosed in application Ser. No. 752,211 of Polizzano and Brorein, filed Aug. 13, 1968. Other aluminum-sheathed cables and methods of manufacture are described by Hollingsworth and Raine in the Institution of Electrical Engineers Proceedings, December, 1954.

BACKGROUND AND SUMMARY OF THE INVENTION

The metal-sheathed electrical cable may by the method of this invention has foamed insulation and may have one or more conductors with polyethylene or polypropylene insulation; and the sheath is typically aluminum or copper with a relatively thin wall. The conductors may be individually insulated and then covered with an extruded foam polyolefin belting as is typical of video-pair or cables of more than one conductor. One or more layers of insulation may be used in the sheath. The single or plural conductors, with or without individual insulation, that are surrounded by the foam insulation described herein, will be referred to as the "core" in this specification.

This invention has three basic methods for making the cable. The first and preferred method is to longitudinally fold a strip into an oversized cylindrical tube over the insulated core, on a continuous basis, and to weld this tube together along the butted edges of the strip; then to sink or draw down this tube to provide a snug fit over the insulated core. When superior adhesion is desired, or lower bonding temperature preferred, the strip or the core may be precoated with an adhesion-promoting material.

The second method is to pull the insulated core into an oversized tube, and then draw the metal tube through a die or sinking rolls in order to sink down this tube to provide a snug fit over the insulated core. The insulated core may be pre-coated with an adhesion-promoting material if desired, for this method of operation.

The third method is to extrude an oversize tube, usually aluminum, over the insulated core, and to sink this tube down to provide a snug fit over the core. The insulated core may be pre-coated with an adhesion-promoting material if desired, for this method.

This invention provides for heating the metallic sheath quickly above the melting or softening point of the foamed polyolefin, or to activate the adhesion-promoting material when used, and then rapidly cooling to control the depth of melt and solidify the materials. This is done after the tube has been sunk down by drawing through the die or reducing rolls and fitted snugly over the insulated core. The terms "reducing rolls," "sinking rolls," or "forming rolls" may be used interchangeably.

In addition, this invention provides for extruding or fabricating the foam-insulated core to make full benefits of this heat-treating process, although normally extruded cores can be used successfully.

By melting the outer layer of foam polyolefin which is compressed against the metallic sheath, the radial compression which extends inward to the center conductor is reduced. The thin shell on the outer surface of the insulation, which is formed during this melting operation, has less effect on the effective dielectric constant than the radial compression, which causes an increase in density and dielectric constant, so a net reduction in effective dielectric constant is obtained at points of compression near the critical area closest to the central conductors where the dielectric constant has the greatest effect. In addition, when the foam insulation is heat-bonded to the metallic sheath, lower initial compression may be used when the sheath is applied over the foam core, thus minimizing the dielectric compression problem.

The outer layer of the foam-insulated core, when melted by the application of heat to the metallic sheath, flows on to the inner side of the sheath and fills any irregularities in the sheath, and when cooled it provides a bond of high strength to the sheath as well as providing a hermetic seal. With typical, commercially available foamed cellular polyethylene materials, this bond is of such high strength that the foamed material itself must be torn apart when it is pulled away from the metallic sheath.

These heat-treated cables, by virtue of the intimate bond between sheath and insulated core, are hermetically sealed against longitudinal leakage, whereas untreated cables will form water and air channels at very low pressures. Heat-treated cables have been tested up to 30 psi (gauge) air pressure with no leakage, whereas untreated cables leak at less than 1 psi (gauge).

BRIEF DESCRIPTION OF THE DRAWING

FIG. 1 is a diagrammatic view of apparatus for making the electrical cable in accordance with the various modifications of the method of this invention;

FIG. 2 is a fragmentary diagrammatic view showing a modification of part of the apparatus shown in FIG. 1;

FIG. 3 is a diagram illustrating the heating and cooling of the cable when using the method of this invention shown in FIG. 1;

FIG. 4 is a diagram showing the heating and cooling of the cable when using the method of this invention shown in FIG. 2;

FIG. 5 is a greatly enlarged sectional view through the cable on the section line 5—5 of FIG. 1;

FIG. 6 is a view corresponding to FIG. 5 but taken on the section line 6—6 of FIG. 1;

FIG. 7 is a view similar to FIG. 6 but showing a modified form of cable;

FIG. 8 is a view similar to FIG. 6 but showing another modification in which more than one layer of foam insulation is used;

FIG. 9 is a sectional view illustrating the way in which void areas may exist within the sheath after sinking of the sheath; and FIG. 10 is a view similar to FIG. 9 after the voids have been filled in accordance with the method of this invention.

DESCRIPTION OF PREFERRED EMBODIMENT

In making the cable of this invention, a foam insulated core 10 is first placed in a metal sheath 12. This can be done by a number of methods, as explained in the description of the background of this invention, and the methods are conventional. Whether the sheath is formed around the foam insulated core by folding a strip or tape longitudinally and welding it, or whether the insulated core is drawn into a seamless tube, the insulated core is always of smaller diameter than the inside diameter of the sheath 12.

The sheath 12 is lubricated by lubricant 14 discharged over the outside of the sheath 12 from a supply nozzle 16. The sheath is pulled through a sinking die 20 by a capstan 22. In place of the sinking die 20, reducing rolls can be used, if desired. Beyond the sinking die 20 the cable sheath passes through a cleaning chamber 26 in which cleaning fluid 28 is discharged against the surface of the sheath from a nozzle 30.

FIG. 5 shows the cable before passage through the sinking die 20. The cable illustrated consists of a center conductor or core 32 surrounded by foamed plastic insulation 34, and the core 32 insulated by the foamed plastic 34 is loose in the sheath 12. As previously explained, the core 32 can have a plurality of conductors and these conductors can be covered with their own individual insulation.

After passage through the sinking die 20 the diameter of the sheath 12 is reduced so that it fits snugly around the foamed plastic insulation 34. It is desirable to have the die 20 of a size to put the foamed plastic insulation under some compression, the purpose of which will be explained in connection with other figures.

Beyond the capstan 22 the sheath 12 passes through an induction heater 40 which raises the temperature of the sheath high enough to bond the foamed plastic to the inside surface of the sheath. This can be done by melting the surface of the foamed plastic which is in contact with the sheath. The heat should not be excessive because melting of the foam to an excessive depth will reduce the volume of the foam so that it no longer fills the inside of the sheath. The permissible amount of melting depends upon how much the foam is compressed by the sheath. The reason that some compression is desirable is that it causes the foam, when heated to a softening temperature and flowable condition, to flow as necessary to touch all portions of the inside surface of the sheath 12.

If the sheath is not completely round, then the softened foam will accommodate itself to any lack of circularity. Where the inside surface of the sheath is not completely smooth, the softened foam, when under some compression, flows into the irregularities so as to have contact with the entire inside surface of the sheath. This results in a better bond and is also useful in obtaining hermetic sealing between the foamed plastic insulation and the inside surface of the sheath 12.

Another type of irregularity results from variations in the inside diameter of the sheath. These may be periodic and caused by minor eccentricity of the rolls by which the sheath is made. Such irregularities cause variations in the compression of the insulation in the sheath at axially spaced locations and this can result in the setting up of standing waves when the cable is used to conduct electricity. This invention eliminates this cable problem because the foamed plastic, when softened, adjusts to any irregularities in inside diameter of the sheath and produces a substantially uniform pressure on the insulation with resulting improvements in the electrical characteristics of the insulation.

Although the maximum permissible melting of the foamed insulation depends upon the compression, it is preferable to have the depth of melting less than 10 percent of the radial thickness of the foam, and in any event, less than 20 percent.

The plastic used for the foamed insulation of this invention is preferably a polyolefin such as polyethylene having a percentage of air of about 45 percent to 55 percent. These values are given by way of illustration. Polypropylene can also be used.

Commercially available foamed polyethylene material, such as Union Carbide's DFA 4860, DFD 4960 and others, will bond, with no extra adhesive materials, to clean copper, aluminum or steel, if the temperature of the sheath is raised quickly to about 300° F to 850° F. for up to 10 seconds and is then quickly quenched or cooled to control the depth of melt. These are not limiting conditions but are typical of usual processing speeds. For example, small cables with aluminum sheaths can be successfully bonded when heated to 600° F. for only 2 or 3 seconds while larger cables require longer periods of time to insure the desired depth of melt which is usually held to about 0.001 inches up to 0.020 inches, depending on the size of cable, but these limits do not cover all sizes and types to which the invention can be applied.

The foamed insulation can be bonded to the inside of the sheath at lower temperature if an adhesion-promoting material is used. When the sheath is formed around the insulated core, such adhesion-promoting material can be applied to the surface of the sheath which will constitute the inside of the sheath after forming, or it can be applied to the outside surface of the foamed insulation. When the insulated core is pulled into an already formed seamless sheath, it is impractical to coat the inside of the sheath and the adhesion-promoting material is applied to the outside of the insulated core before pulling the core into the seamless tubing.

The advantage of using adhesion-promoting material is that it melts at a lower temperature than that of the foamed insulation. Examples of suitable adhesion-promoting materials are the amorphous polypropylene family as made by Avisun Corporation, such as Oletac TD-133 and these may be used for special designs where it is not desirable to heat the sheath over about 300° F. to 400° F. Polyolefin and acrylic acid copolymers may also be used to promote adhesion. This type is known also as polyolefin copolymers containing carboxyl groups and is useful in maintaining a bond under severe environmental conditions.

Close beyond the heater 40 the sheath 12 passes through a quenching chamber 44 in which water or other cooling fluid 46 is discharged against the sheath 12 from one or more nozzles 48. This quenching provides a control on the depth of melting. The period of time between the heating and quenching depends upon the axial spacing of the quenching chamber 44 from the heater 40 and upon the speed of travel of the cable. The depth of melt can be controlled by changing the amount of heating or the speed of travel of the cable or the spacing of the quenching chamber from the heater. Means for changing the speed of travel of the cable are shown diagrammatically in FIG. 1 as a motor 50 which drives the capstan 22, the motor being supplied with power from a power line 52 through a speed controller 54.

Beyond the quenching chamber 44, the cable sheath is advanced by another capstan 22' having driving means similar to the capstan 22 and indicated by the same reference characters with a prime appended.

The reason for the use of two capstans 22 and 22' is to avoid excessive pull on the cable sheath while it is heated by the heater 40. Considerable pull is necessary to advance the cable sheath through the sinking die 20, or reducing rollers if rollers are used, and the tension imparted to the sheath by this pull is more than the tube can withstand without stretching when highly heated.

Although it is more economical to assemble the insulated core and sheath in a continuous operation with the sinking of the sheath and the heating and quenching operations of this invention, it is not essential that these operations be combined. Foam-insulated cable with the sheath fitting snugly around the insulated core can be supplied from reels on which it has been stored and can be treated by the heating and quenching of this invention; and in such cases it is not necessary to use two capstans, since the cable is subject to very little tension when merely unwound from a reel.

In addition to the bonding of the foamed insulation to the sheath and the equalizing of the pressures in the insulation, the heating of the sheath by the heater 40 serves another important purpose. In the use of aluminum and copper sheaths, the metal is work-hardened by the sinking operation which reduces the diameter of the sheath to fit snugly around the insulated core. This hardening makes the cable stiff. The heating of the sheath in accordance with this invention anneals the sheath and substantially increases the flexibility of the cable.

Although the single heating and quenching step illustrated in FIG. 1 can be used to effect both the fusion bond and a degree of annealing of the sheath, better results are obtained with a two-stage heating and quenching, such as illustrated in FIG. 2.

The apparatus shown in FIG. 2 includes the heater 40 and the quenching chamber 44; and also includes a second heater 60 with a quenching chamber 64 located beyond the quenching chamber 44 in the direction in which the cable sheath 12 travels. In the quenching chamber 64 the sheath is quenched by water 66 or other cooling fluid discharged against it from a nozzle 68 in the same manner as already described for the quenching chamber 44. Elements 40 and 44 are closer than in FIG. 1.

FIGS. 3 and 4 illustrate the difference in the operation of the invention when using the single heating and the two-stage heating of FIGS. 1 and 2, respectively. FIG. 3 shows the sheath heated rapidly to a temperature of approximately 600° F. to 750° F. in a period of time T–1. As the sheath passes beyond the heater, it cools during a dwell time T–2 as it passes from the heater to the quenching chamber. The sheath is then cooled quickly during a period of time T–3 to ambient temperature. This heating is not ideal for either annealing the sheath or fusing the foamed insulation, but is a practical and effective compromise if both the annealing and fusing are to be performed in the same operation.

FIG. 4 shows the two-stage heating and quenching of FIG. 2. The sheath is heated rapidly to a higher temperature than in FIG. 3, for example, approximately 800° F. and is immediately cooled so as to prevent excessive melting of the foamed insulation. As the cable travels to the next heating step, any plastic which softened or melted during the annealing heating has an opportunity to cool. The sheath is then reheated to a temperature sufficient to cause the foamed insulation to bond to the sheath and the heating period T-P is long enough to produce the desired depth of softening necessary for equalizing pressures and producing flow into any irregularities. The heating during this period T-P is kept at a low enough temperature so that the foam obtains the desired temperature gradients. A temperature of 400° F. is shown in FIG. 4 as illustrative. The temperature used for this second heating period may be higher or lower, depending upon whether adhesion-promoting material is used, as previously described, and depending upon the softening point of the particular foam used.

FIG. 6 shows the final cable with the outer sheath 12 of annealed metal fused to a bonded outer layer of the foamed insulation 34, this outer layer being designated by the reference character 34'.

When an adhesion-promoting material is used on the inside of the sheath 12 or on the outside of the insulation 34, it forms a layer 35 as shown in FIG. 7.

FIG. 7 shows a cable which is similar to FIG. 6 except that the core contains two conductors 70 each of which is covered with a layer of insulation 72 which may be of any desired type. These conductors 70, with their insulation 72, are a twisted pair and for purposes of this invention are considered a core surrounded by foamed insulation 34 which serves the purpose of the conventional belting layer.

FIG. 8 shows a modified form of the cable of this invention. In this modification the core consists of a conductor 76 and the foamed insulation between this conductor core 76 and the sheath 12 is applied in two layers instead of the single layer shown in FIG. 6. These two layers include an inner layer 78 of foamed insulation and an outer layer 79 which is also foamed insulation. In practice, these two layers 78 and 79 may be extruded successively or simultaneously and the outer layer 79 is a softer or less dense foam than the inner layer 78. The softer layer 79 has the advantage of accommodating itself more easily to irregularities in the Sheath 12.

FIGS. 9 and 10 show an example of one type of irregularity with which this invention is particularly useful. In FIG. 9 a sheath 90 has a seam 92 which is welded with a flash or bead 94 which holds the insulation 34 spaced from the inside surface of the sheath 90 on both sides of the flash or bead 94 so as to leave void areas 96 on each side of the flash or bead 94. This would leave a substantial area of the insulation unbonded to the sheath if the insulation did not flow to fill up the voids 96.

FIG. 10 shows the way in which the insulation 34 flows in and fills up the voids on both sides of the flash or bead 94 when the insulation 34, which is under some compression, is heated to its softening point.

The preferred embodiments of the invention have been illustrated and described, but changes and modifications can be made and some features can be used in different combinations without departing from the invention as defined in the claims.

What is claimed is:

1. The method of making an electrical cable including applying foam insulation around a core of a cable, subsequently surrounding the foam insulation with a metal sheath, compressing the foam initially by pressure of the metal sheath, and relieving pressure in the foam and fusion-bonding the insulation to the inside surface of the cable sheath by heating the sheath.

2. The method described in claim 1 characterized by compressing the foamed insulation with firm contact against the metal sheath and then relieving at least some of the compression and causing the insulation to fill any irregularities in the inner surface of the sheath by heating the insulation to a temperature that softens to a flowable condition the portion of the insulation which is in contact with the sheath, whereby the insulation flows into any irregularities in the inside surface of the sheath.

3. The method described in claim 2 characterized by the tube being heated quickly and then rapidly cooled to limit the depth of penetration of the melt of the foam insulation.

4. The method described in claim 1 characterized by surrounding the foam insulated core progressively with the metal sheath and having the inside diameter of the metal sheath substantially larger than the outside diameter of the core, as the core and sheath advance with continuous motion, sinking the sheath to a diameter that causes the sheath to contact the insulation with controlled pressure after the sinking operation, and controlling the heating time by regulating the rate of said continuous motion.

5. The method described in claim 4 characterized by applying a pulling force to the sheath to pull it through apparatus that sinks the sheath, applying the heat for fusion bonding at a location beyond the application of the pulling force in the direction in which the sheath is pulled, and pulling the sheath to advance it beyond the region of heating, this last pulling step being with a force controlled to prevent the sheath from being stressed beyond its yielding point at the elevated temperature during the heating of the sheath.

6. The method described in claim 1 characterized by coating the insulation with an adhesion-promoting material that bonds to both the insulation and the sheath, forming the sheath into a tube around the insulated core by longitudinally folding a metal strip around the insulated core, welding the seam of the tube closed, and after welding, and some subsequent cooling to a temperature less than melting temperature of the foam, sinking the tube into contact with the adhesive coated core.

7. The method described in claim 1 characterized by coating the sheath with an adhesive-promoting material that bonds to both the insulation and the sheath, forming the sheath into a tube around the insulated core by longitudinally folding a metal strip around the insulated core, welding the seam of the tube closed, and sinking the tube into contact with the insulated core.

8. The method described in claim 1 characterized by applying a thermoactivated adhesion-promoting material to the core, sinking the sheath into contact with the adhesion-promoting material, and activating the adhesion-promoting material by applying heat to the sheath.

9. The method described in claim 1 characterized by covering the core with a first layer of foamed insulation, covering the first layer with an outer layer of softer foamed insulation, applying a metal sheath over the softer insulation with some pressure against the softer insulation, and heating the insulation through the sheath.

10. The method described in claim 9 characterized by applying sufficient heat to raise the temperature of the sheath to an annealing temperature, and cooling the sheath by a flow of cooling fluid to limit the softening of the insulation.

11. The method described in claim 10 characterized by the heating of the sheath being divided into two steps including one step that raises the metal of the sheath to an annealing temperature, said step being performed in a heating period of short duration to prevent excessive fusion of the foam within the sheath, and another step that raises the metal of the sheath to a temperature substantially less than the annealing temperature and for a period of longer duration than the first step for obtaining a desired depth of softening of the foamed insulation.

12. The method described in claim 1 characterized by the method being applied to a cable of from about ¼ inch to 2 ½ inches diameter with an aluminum sheath of from about 0.010 to 0.150 inches in thickness, and foamed polyethylene insulation having a specific gravity of approximately 45 percent, advancing the cable and sheath continuously past a heat source, correlating the speed of the cable with the intensity and length of the heat source so as to heat the sheath to a temperature of about 500°–850° F in less than 10 seconds, cooling the tube quickly after reaching that temperature, and maintaining the core and sheath in a straight line during heating and cooling and while passing from the region of heating to the region of cooling.

13. In the making of electric cable that has a core surrounded by foamed insulated in a snugly fitted metal sheath that puts the foam under compression, the improvement which comprises heating the metal sheath to a given temperature for a period that softens the outside of the foamed insulation to relieve compression and fuse the foam to the sheath.

14. The method described in claim 13 characterized by bringing the temperature of the metal sheath during at least a part of the heating period to a temperature high enough to anneal the metal sheath.

* * * * *